United States Patent [19]

Douglas et al.

[11] Patent Number: 5,491,783

[45] Date of Patent: Feb. 13, 1996

[54] METHOD AND APPARATUS FOR FACILITATING INTEGRATED ICON-BASED OPERATIONS IN A DATA PROCESSING SYSTEM

[75] Inventors: Thomas B. Douglas, Dallas; Robert J. Torres, Colleyville, both of Tex.

[73] Assignee: International Business Machines Corporation, Armonk, N.Y.

[21] Appl. No.: 175,997

[22] Filed: Dec. 30, 1993

[51] Int. Cl.⁶ .................................................. G06F 15/00
[52] U.S. Cl. ............................................................... 395/159
[58] Field of Search ...................................... 395/155–161

[56] References Cited

U.S. PATENT DOCUMENTS

| | | | |
|---|---|---|---|
| 5,040,131 | 8/1991 | Torres | 395/156 |
| 5,157,763 | 10/1992 | Peters et al. | 395/157 |
| 5,291,587 | 3/1994 | Kodosky et al. | 395/157 |
| 5,301,301 | 4/1994 | Kodosky et al. | 395/159 |
| 5,339,392 | 8/1994 | Risberg et al. | 395/161 |
| 5,345,550 | 9/1994 | Bloomfield | 395/156 |
| 5,353,399 | 10/1994 | Kuwamoto et al. | 395/159 |
| 5,384,910 | 1/1995 | Torres | 395/156 |

OTHER PUBLICATIONS

Anonymous, "Drag and Drop Available Target Indicator", RD 34144, *Research Disclosure*, Sep. 1992, p. 711.

Primary Examiner—Heather R. Herndon
Assistant Examiner—Joseph R. Burwell
Attorney, Agent, or Firm—Jonathan E. Jobe, Jr.; Melvin A. Hunn; Andrew J. Dillon

[57] ABSTRACT

A method and apparatus is provided for facilitating operator initiated integration of items between software objects in a graphical user interface. In this technique, the operator selects a source software object. The source software object includes data items which may be selected by the operator. During an integrated operation mode of operation, a graphical pointing device is utilized by the operator to data select items which are present in the source software object. By manipulating the graphical pointing device, the operator then selects a particular icon, which includes representative of either software objects or data processing implemented operations. The data processing system is programmed to then automatically initiate a particular data processing implemented operation which involves the recorded operator selection of the data items and the software object or data processing implemented operation which is represented by the icon selected by the operator. In some instances, a single predetermined contextual relationship exists between the selected data items and the selected icon. In that case, that particular data processing implemented operation is performed. If there is no single contextual relationship between the selected data items and the selected icon, a menu is displayed to allow the operator to select a particular data processing implemented operation which is to be performed.

18 Claims, 12 Drawing Sheets

METHOD AND APPARATUS FOR FACILITATING INTEGRATED ICON-BASED OPERATIONS IN A DATA PROCESSING SYSTEM

CROSS-REFERENCE TO RELATED APPLICATION

The present application is related to U.S. patent application Ser. No. 08/175,998, entitled "Method and Apparatus for Facilitating Integration of Software Objects Between workspaces in a Data Processing System Graphical User Interface," filed of even date herewith by the inventors hereof and assigned to the assignee herein, and incorporated by reference herein.

BACKGROUND OF THE INVENTION

1. Technical Field

The present invention relates in general to graphical user interfaces for data processing systems, and in particular to techniques which facilitate interaction between software objects in a graphical user interface.

2. Description of the Related Art

Graphical user interfaces are now widely utilized in software to facilitate control over an ever-expanding set of software objects which are to be manipulated and controlled. These software objects include operating system programs, application programs such as word processing programs, spread sheets, and personal information managers, but also include a variety of databases as well as libraries of archived documents.

One principle advantage of graphical user interfaces is that they allow operators to perform tasks on a large variety of software objects, notwithstanding the fact that the operators may have infrequent occasion to use all the software objects. This is true because most graphical user interfaces are designed with ease of use as the predominant design criteria. To the maximum extent possible, graphical user interfaces will utilize symbology and command structures which are consistent with an operator's intuition; that is: to the maximum extent possible graphical user interfaces provide a mirror-image of the real world. This is a significant advantage since programs can be learned quickly and with little effort.

One significant disadvantage of the utilization of graphical user interfaces is that many operations which are performed are slowed down significantly by the requirement that a graphical pointing device be manipulated in a manner which interacts with menus, buttons, and iconographic representations of software objects. Graphical user interface operations such as "pointing and clicking" and "dragging and dropping" necessarily require a greater amount of time than that required of interfaces which are predominantly activated through utilization of the data processing system keyboard.

It is now one industry-wide objective to maintain the advantageous "intuitive" nature of graphical user interfaces while allowing for increased speed in performing common or routine tasks within the graphical user interface.

SUMMARY OF THE INVENTION

It is one objective of the present invention to provide a method of facilitating icon-based operations in a data processing system graphical user interface, wherein the operator's selection of data items from an active and open software object is recorded for automatic inclusion in a data processing implemented operation upon detection of the operator's selection of a particular icon which is representative of either a software object or a data processing implemented operation.

It is another objective of the present invention to provide a method of facilitating icon-based operations in a data processing graphical user interface, wherein the operator's selection of data items is recorded in memory and utilized to perform a particular data processing implemented operation when the graphical pointing device of the data processing system is utilized to select an icon which is representative of a software object or data processing implemented operation, wherein the data processing system automatically determines whether or not a single predetermined contextual relationship exists between the plurality of data items and the icon, and performs that operation if it exists, but if no predetermined contextual relationship exists, the data processing system responds by automatically displaying a menu associated with an operator-selectable visual representation of an integration operation association which provides a plurality of data processing operations which can be performed which involve selected data items and the selected icon.

These and other objectives are achieved as is now described. The present invention is directed to a method of facilitating icon-based operations in a data processing system graphical user interface. The graphical user interface has a plurality of icons representative of either software objects or data processing implemented operations. In accordance with the present invention, at least one software object in the graphical user interface is allowed to remain open and active in a visual display. This open and active software object displays a plurality of data items. In the graphical user interface, a visual representation is provided of an integrated operation association between (1) the software object active in the visual display of data processing system, and (2) at least one of the plurality of icons which are representative of either software objects or data processing implemented operations. Preferably, the plurality of icons are provided in a toolbar in the graphical user interface of the data processing system. In accordance with the present invention, the data processing system continually monitors for operator selection of the visual representation of the integrated operation association. Once the data processing system detects operator selection of the visual representation of the integrated operation association, the data processing system monitors and records the operator's utilization of a graphical pointing device to select at least one of the plurality of data items which are present in the software object which is open and active in the visual display. In accordance with the present invention, the operator may select one or many of the data items from the open and active software object. The data processing system also continuously monitors for operator utilization of the graphical pointing device to select at least one of the plurality of icons. The operator selection of an icon causes the automatic initiation of the performance of a particular data processing implemented operation which involves (1) the recorded operator selection of the data items from the open and active software object in the visual display of the data processing system, and (2) the software object or data processing implemented operation which is represented by the selected icon.

In accordance with the present invention the particular data processing implemented operation which is initiated is determined in two ways. In some cases, a predetermined contextual relationship exists between the software object which is open and active in the visual display and the icon which has been selected by the operator. For example, if a plurality of data items are selected from a personal address book, and the operator utilizes the graphical pointing device to select a printer icon, it is clear that the contextual relationship identifies that a printing operation is desired, and such operation is initiated. However, in some situations there is no single predetermined contextual relationship between the data item selected by the operator and the icon selected by the operator. In those cases, the data processing system automatically provides and displays a menu which is associated with the operator selectable visual representation of the integrated operation association. This menu includes a plurality of operator menu items. The data processing system then monitors for operator selection of a particular one of the plurality of menu items, and then performs the data processing implemented operation which is identified with the particular menu item which has been selected by the operator. The particular data processing implemented operation will include the recorded operator selection of the plurality of data items and the software object or data processing implemented operation represented by the icon which has been selected by the operator. For example, if the operator selects data items from a personal address book, selects the icon which is representative of a shared address book, it is not clear what particular operation, if any, the operator desires to accomplish. Therefore, a menu which is associated with the visual representation of the integrated operation association is provided and displayed. This menu will include a plurality of operator-selectable menu items such as copy, delete, and search. The operator chooses one of these commands, such as the "copy" command, which will automatically initiate the data processing implemented operation of copying the data items selected by the operator in the personal address book to the shared address book.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
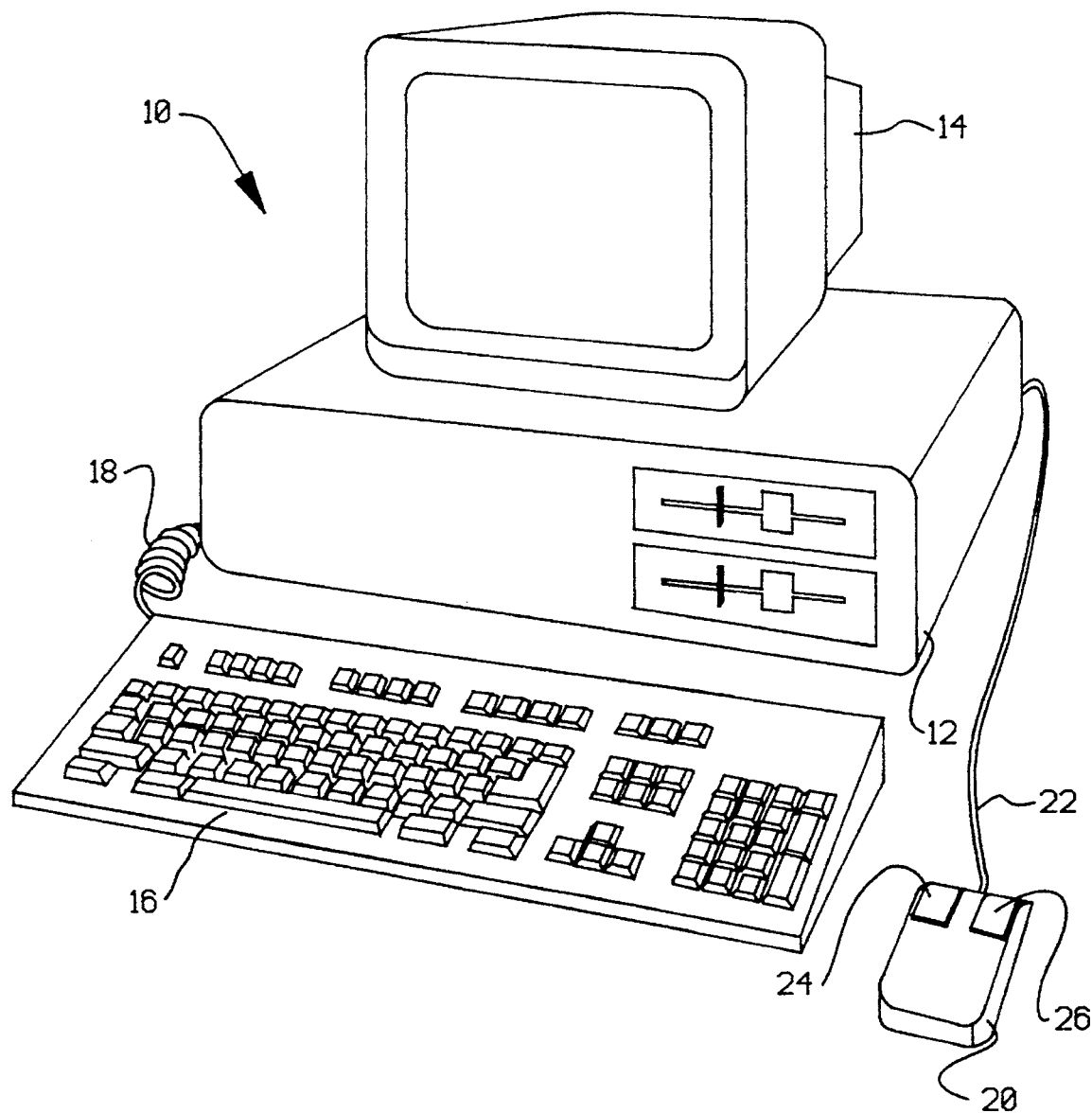
FIG. 1 is a pictorial representation of a data processing system which may be programmed in accordance with the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24 and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, N.Y.

Figure 2:
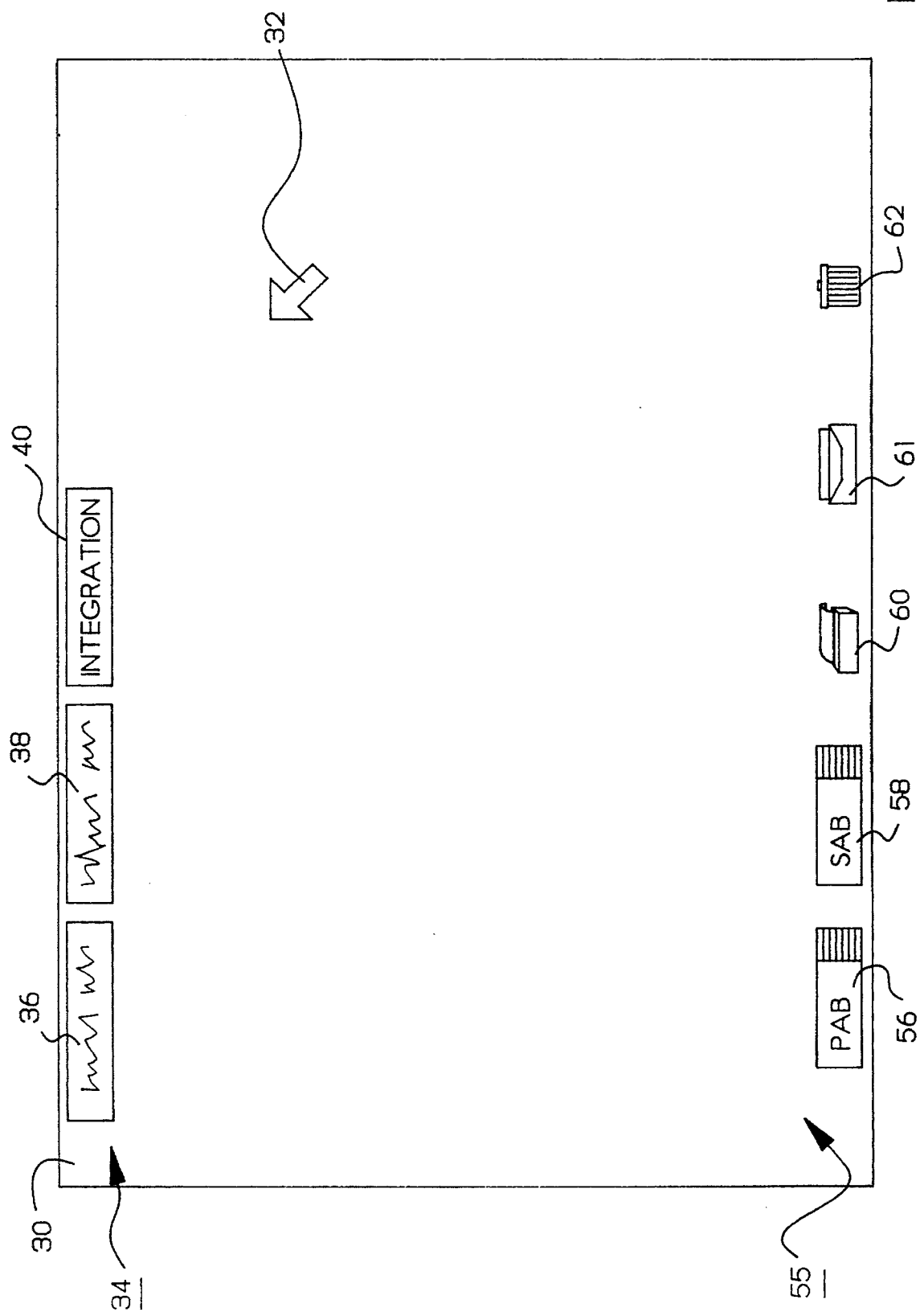
FIGS. 2 depicts a display of the data processing system of FIG. 1 with a visual representation of the integrated operation association of the present invention.

FIG. 2 is a depiction of display screen 30 of video display 14 of data processing system 10. Display screen 30 includes cursor 32 which is moved about display screen 30 through operation of graphical pointing device 20 (of FIG. 1). Display screen 30 also includes software buttons 34, including button 36, and button 38 (which represent conventional software buttons), and integration button 40. Cursor 32 may be utilized to select a function represented by buttons 34. In the preferred embodiment of the present invention, cursor 32 may be utilized to select the integration button 40, which may be utilized by the operator to initiate the integrated association mode of operation in accordance with the present invention.

As is also shown in FIG. 2, a plurality of icons 55 are disposed along the lowermost portion of display screen 30, and include personal address book icon 56, shared address book icon 58, printer icon 60, mail drawer icon 61, and trash can (delete) icon 62. As is conventional, cursor 32 may be positioned through actuation of graphical pointing device 20 to overlie a particular one of icons 55 to (1) select or "open" the document which is represented by a particular one of icons 55 during a "point and click" operation, or (2) initiate a particular data processing operation which is represented by a particular one of icons 55.

In the preferred embodiment of the present invention, an integrated association mode of operation is selected by the operator through utilization of cursor 32 to select integration button 40 in a "point and click" operation. The selection by the operator of the integrated association mode of operation may occur either while one or more workspaces are active and open in the display 30, or prior to the opening of any software object. In the example of FIGS. 2, 3, 4, and 5, these variations are discussed. Preferably, when the integrated association mode of operation is selected by the operator, a visual indication is provided in display 30 to remind the operator that this particular mode of operation has been selected. In the preferred embodiment, integration button 40 may be highlighted or accentuated to emphasize to the operator that the utilization of cursor 32 will result in functions associated with the integrated association mode of operation. This can be accomplished by displaying the objects in a different color, a different grayscale value, or as a flashing object. This is especially useful when a plurality of workspaces are provided in overlapping relation within the graphical user interface, crowding the interface and making it difficult for the operator to keep track of his or her interaction with the interface.

Figure 3:
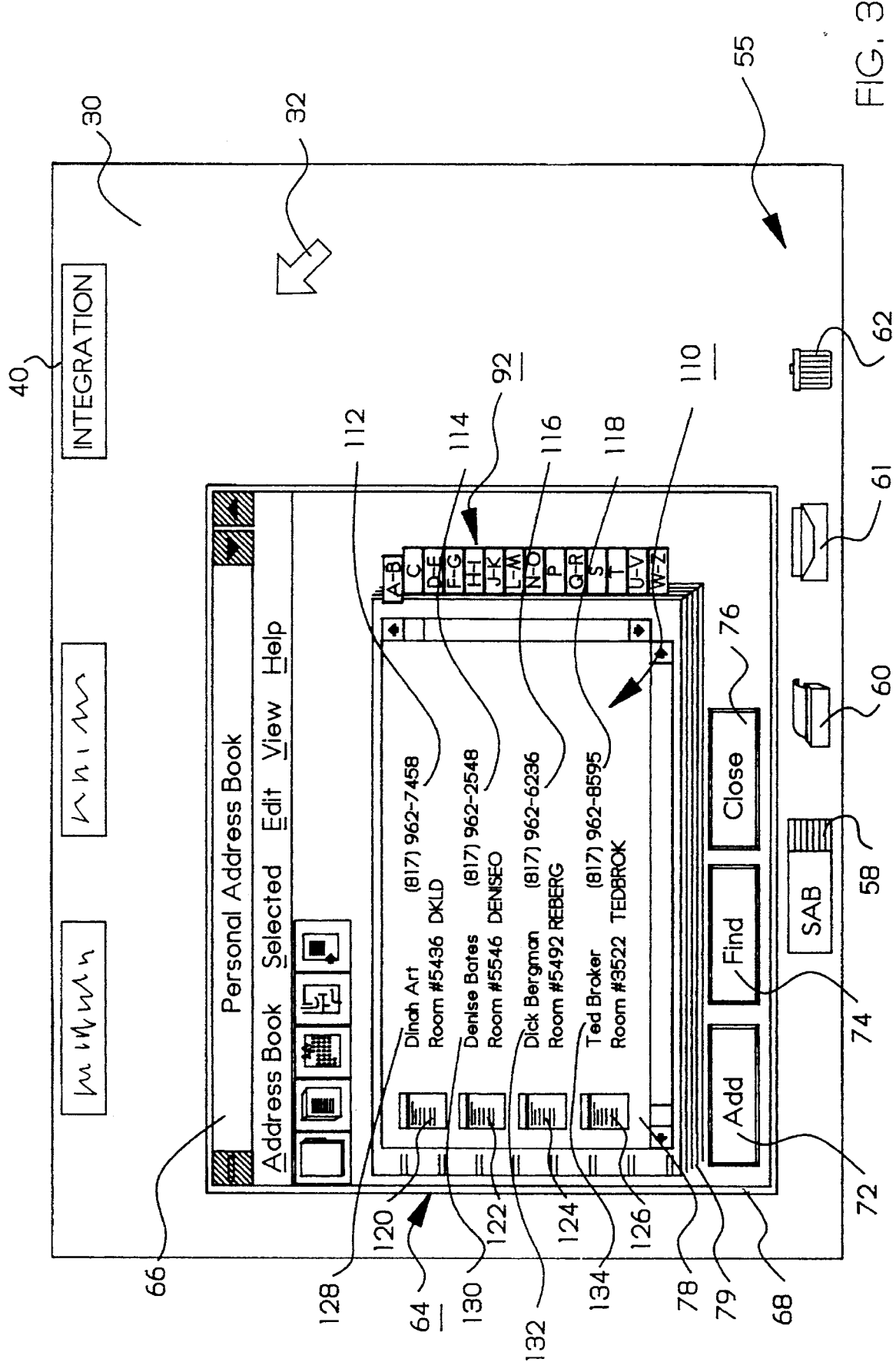
FIG. 3 depicts the display of FIG. 2 with a software object (a personal address book) open and active in the visual display.

With reference to FIG. 2, cursor 32 may be utilized to select the integrated association mode of operation by placing cursor 32 over integration button 40, and depressing one or both of the mouse buttons. Preferably, the integration button 40 is highlighted or accentuated to identify to the operator that this integrated association mode of operation has been selected. Next, the operator may utilize cursor 32 to select a particular one of the plurality of icons 55. As is conventional, selection of an icon in a "point-and-click" operation results in "opening" of a particular software object. For example, cursor 32 may be utilized to select for opening personal address book 56 by placing cursor 32 over personal address book icon 56 and clicking one or more of the mouse buttons. This software object is "opened" as is depicted in FIG. 3. In accordance with the present invention, if integration button 40 has previously been selected, then an integration "association" is developed between data items which are selected from the personal address book which is represented by personal address book icon 56 and a subsequently selected software object or data processing operation. For example, cursor 32 can be utilized to select one or more address book entries from personal address book 56. Then, cursor 32 may be utilized to select another one of the plurality of icons 55, such as a shared address book which is represented by shared address book icon 58 or a printer which is represented by printer icon 60. For each set of (1) data items selected from a software object and (2) icon which is representative of either a software object or data processing operation, a definite contextual relationship either exists or does not exist. For example, for (1) data items selected from the personal address book which is represented by personal address book icon 56 and (2) printer which is represented by printer icon 60, the contextual relationship is clear. The data items selected from personal address book 56 are to be printed on printer 60. However, should the data item selected from personal address book 56 be associated with the shared address book which is represented by shared address book icon 58, the contextual relationship is unclear. It is not clear what, if anything, is to be done with the data items selected from personal address book 56 with regard to shared address book 68. In these situations, a menu is automatically provided which allows the operator to select a particular operation which must be performed utilizing the data items selected. This feature will be discussed in greater detail below.

As is shown in FIG. 3, personal address book viewport 65 includes title bar 66 which identifies the document as a "personal address book", but also includes menu bar 68 which includes a number of user-selectable commands, and buttons (including add button 72, find button 74, and close button 76) which can be manipulated or actuated through utilization of cursor 32 during a "point and click" operation to perform the functions of adding data items to the personal address book, finding a particular data item in the personal address book, or closing the personal address book. As is shown in FIG. 3, personal address book viewport 64 further includes a visual representation of a page 78 from a physical address book. Personal address book viewport 64 further includes a simulation of stacking 79 as well as tab portion 92 which includes alphabetical tabs.

The operator may navigate through the personal address book by moving cursor 32 to a particular alphabetic tab, and then performing a "clicking" operation to turn the address book to that page. In response to the operator selection, data processing system 10 will immediately display a simulation of a page with data on it which corresponds to the alphabetic tab. For example, operator selection of the "S" tab will display an address book page which includes entries which identify individuals which have last names which begin with the letter "S". In the view of FIG. 3, a plurality of data items are shown. Each data item includes a plurality of data fields, including name field, telephone number field, and building address field. Each data item further includes an icon which provides a visual representation of the information contained in the data fields.

In the view of FIG. 3, the page containing listing of individuals having last names beginning with the letters "A" or "B" is displayed. As is shown, this page includes a plurality of data items 110, with each data item representing an entry in the shared address book. Data item 112 identifies "Dinah Art", and includes a plurality of data fields 128 for name, telephone number, building address, and network identification, as well as icon 120 which is representative of the entry. Data items 110 further includes data item 114 which identifies "Denise Bates", and includes a number of data fields 130 for name, telephone number, building address, and network identification, as well as icon 122 which is representative of the entry. Data item 110 further includes data item 116 which identifies "Dick Bergman" and includes data fields 132 such as address field, telephone number field, building address field, and network identification, but also includes icon 124 which represents this entry. Finally, data items 110 includes data item 118 which identifies "Ted Broker", and includes data fields 134 such as name field, a telephone number field, a building address, and a network identification, as well as icon 126 which is representative of this entry.

Figure 4:
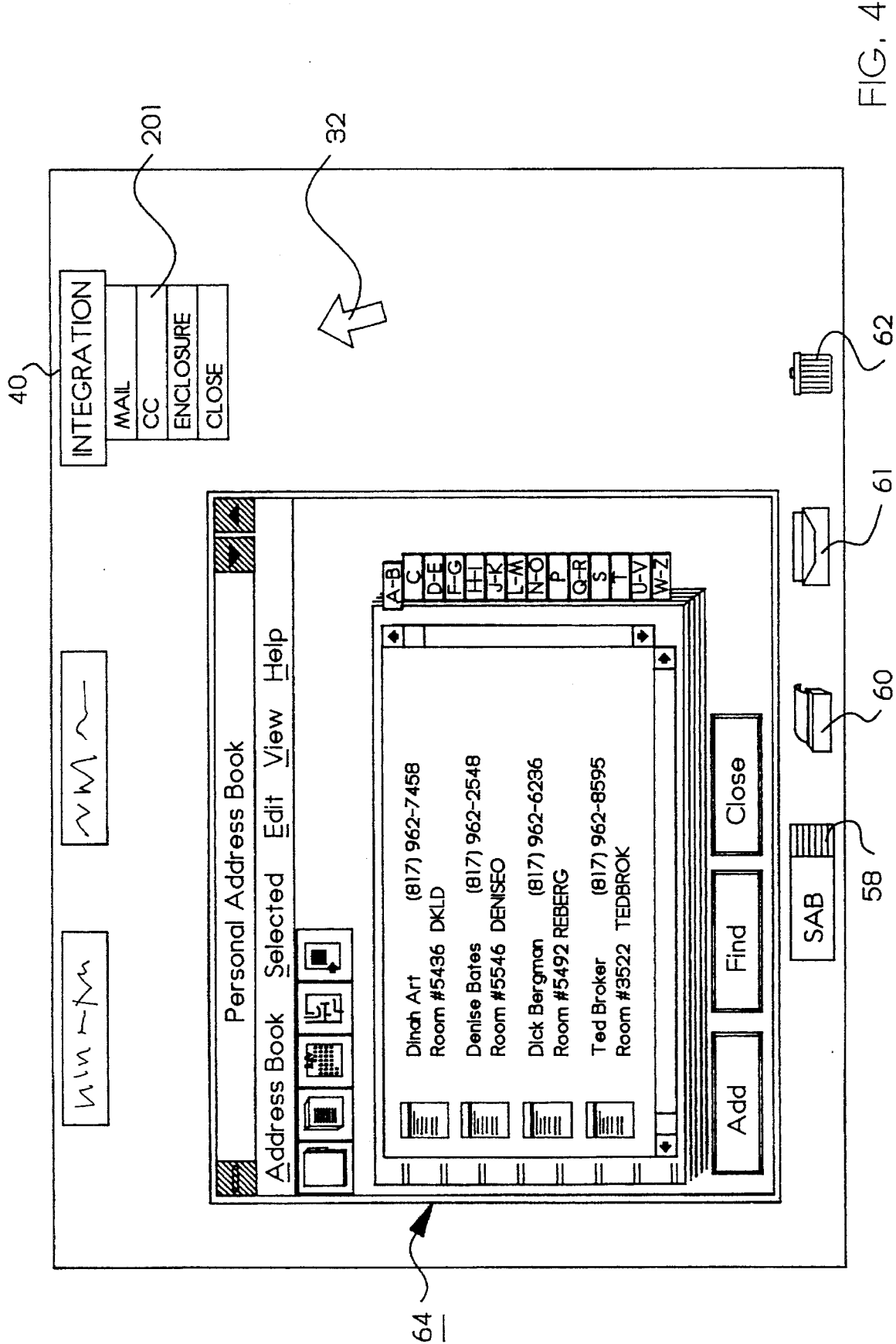
FIG. 4 depicts the graphical user interface of FIG. 3 with a pop-up menu displayed in association with the visual representation of the integrated operation association.
Figure 5:
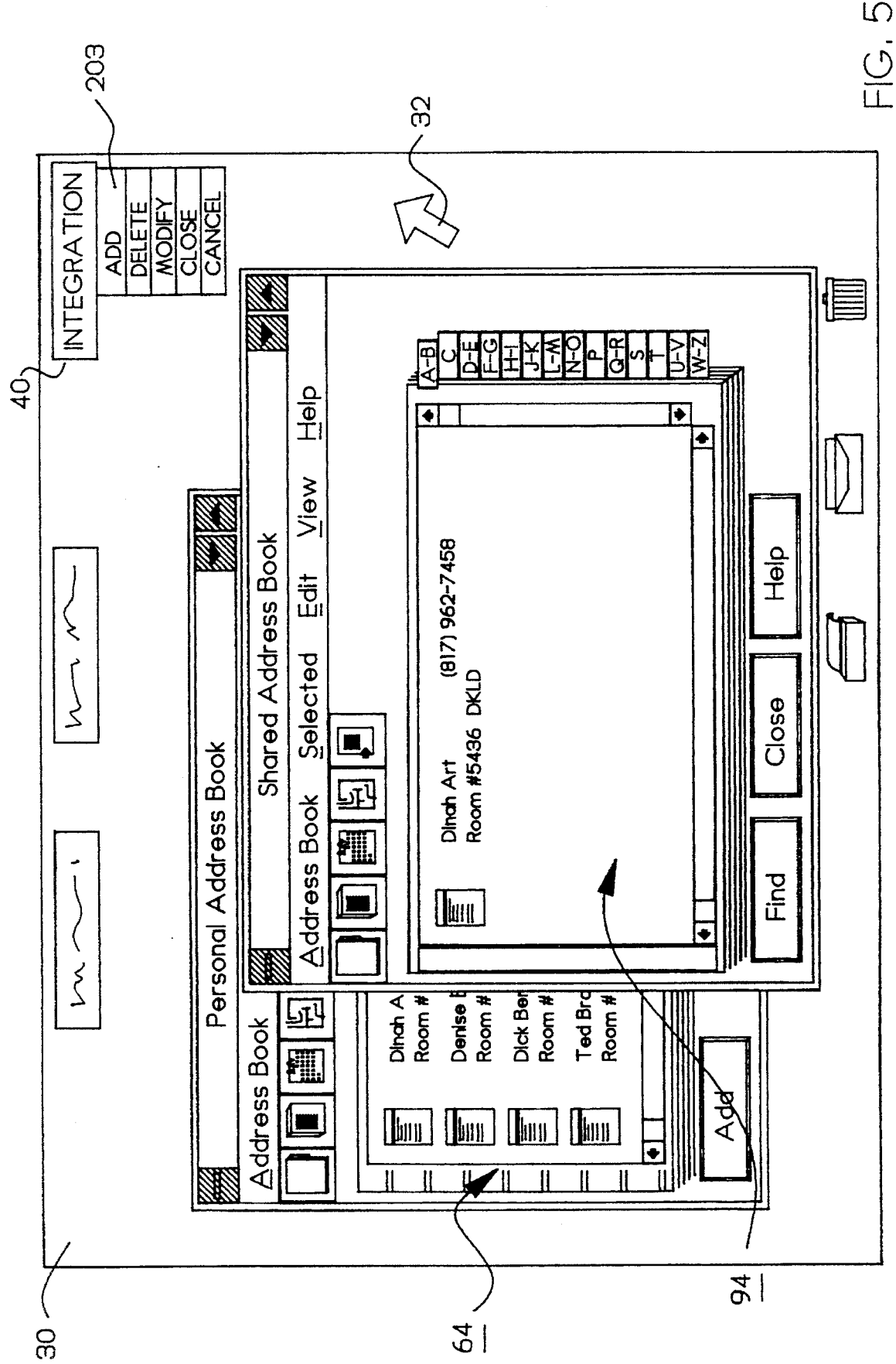
FIG. 5 depicts the graphical user interface of FIG. 2 with two active and open software objects in overlapping positions.
Figure 6A:
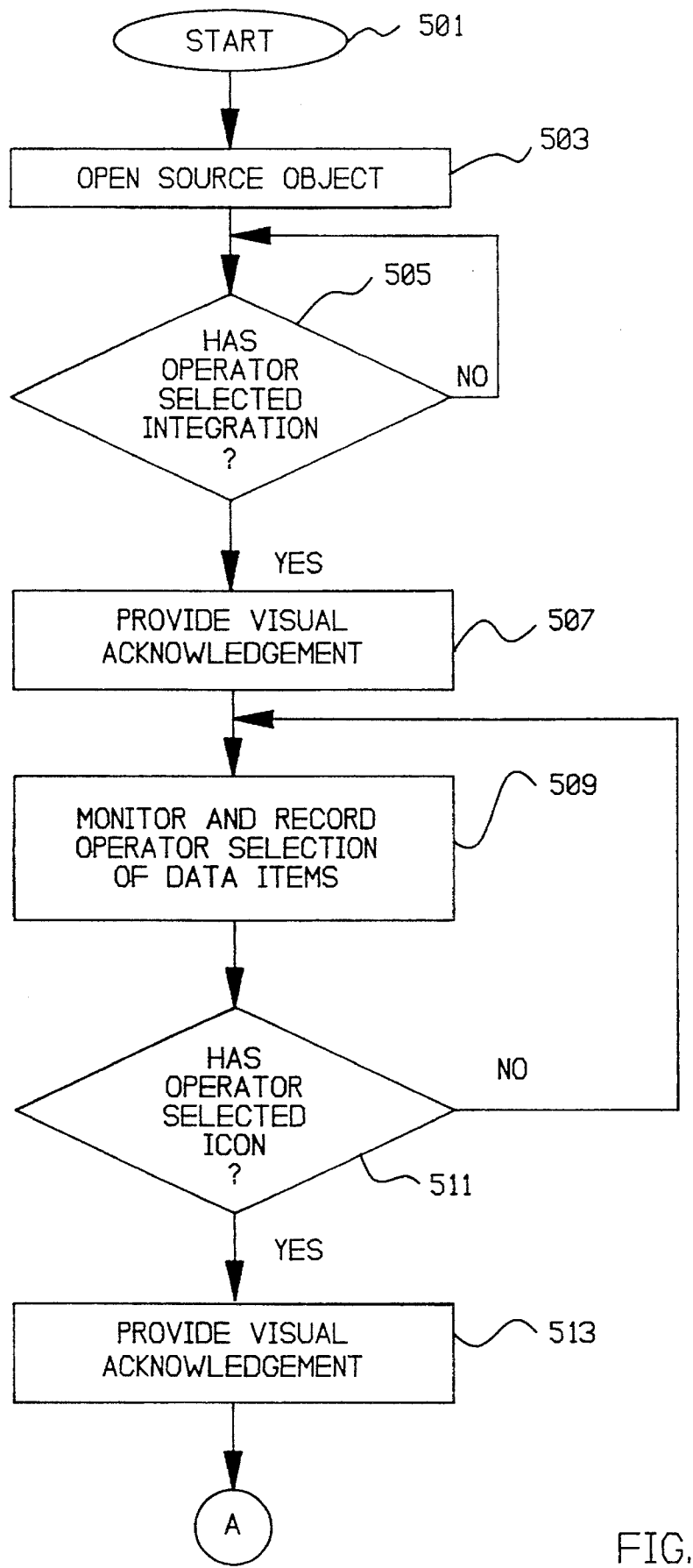
FIGS. 6A–6D are a high level flowchart representation of the integrated operation association mode of operation, in accordance with the present invention.
Figure 6B:
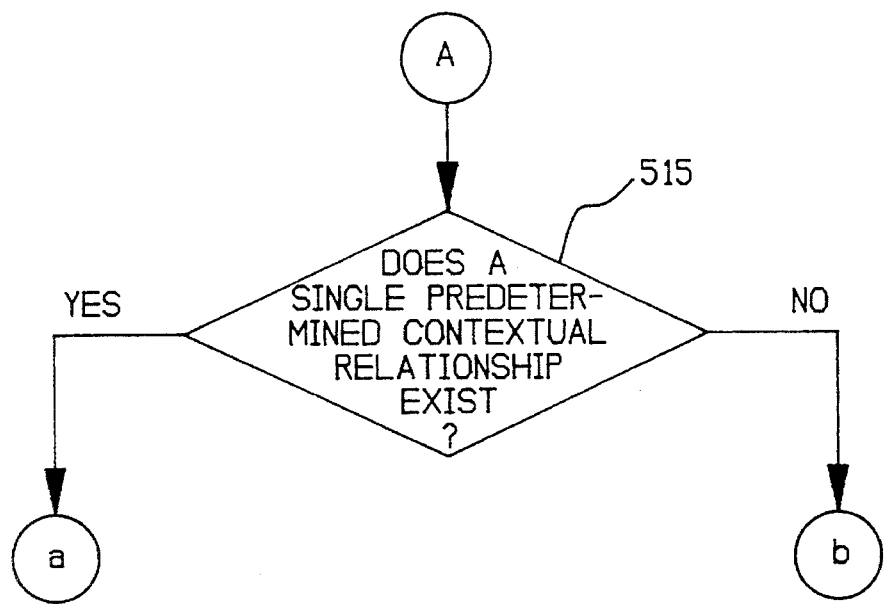
Figure 6C:
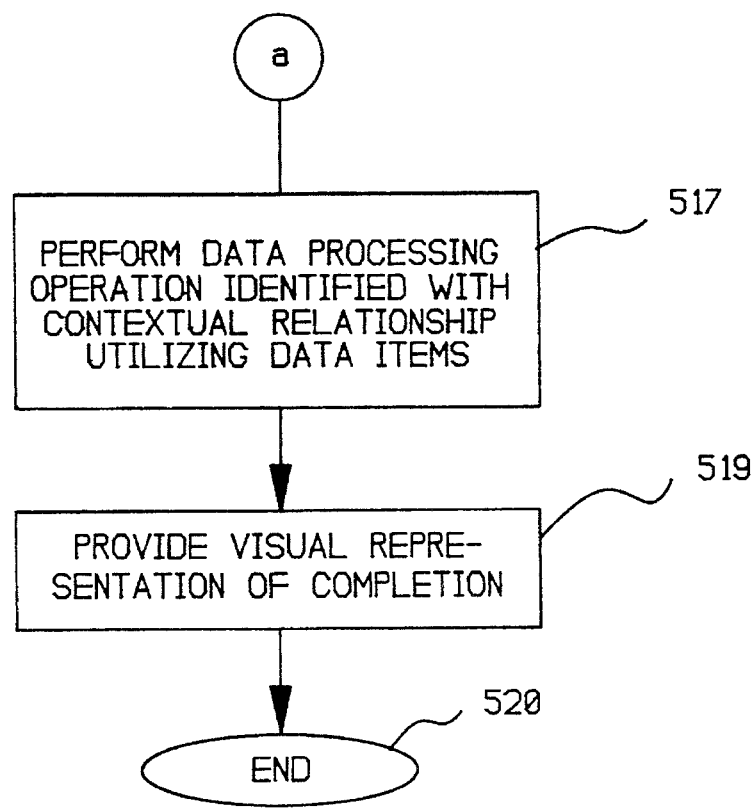
Figure 6D:
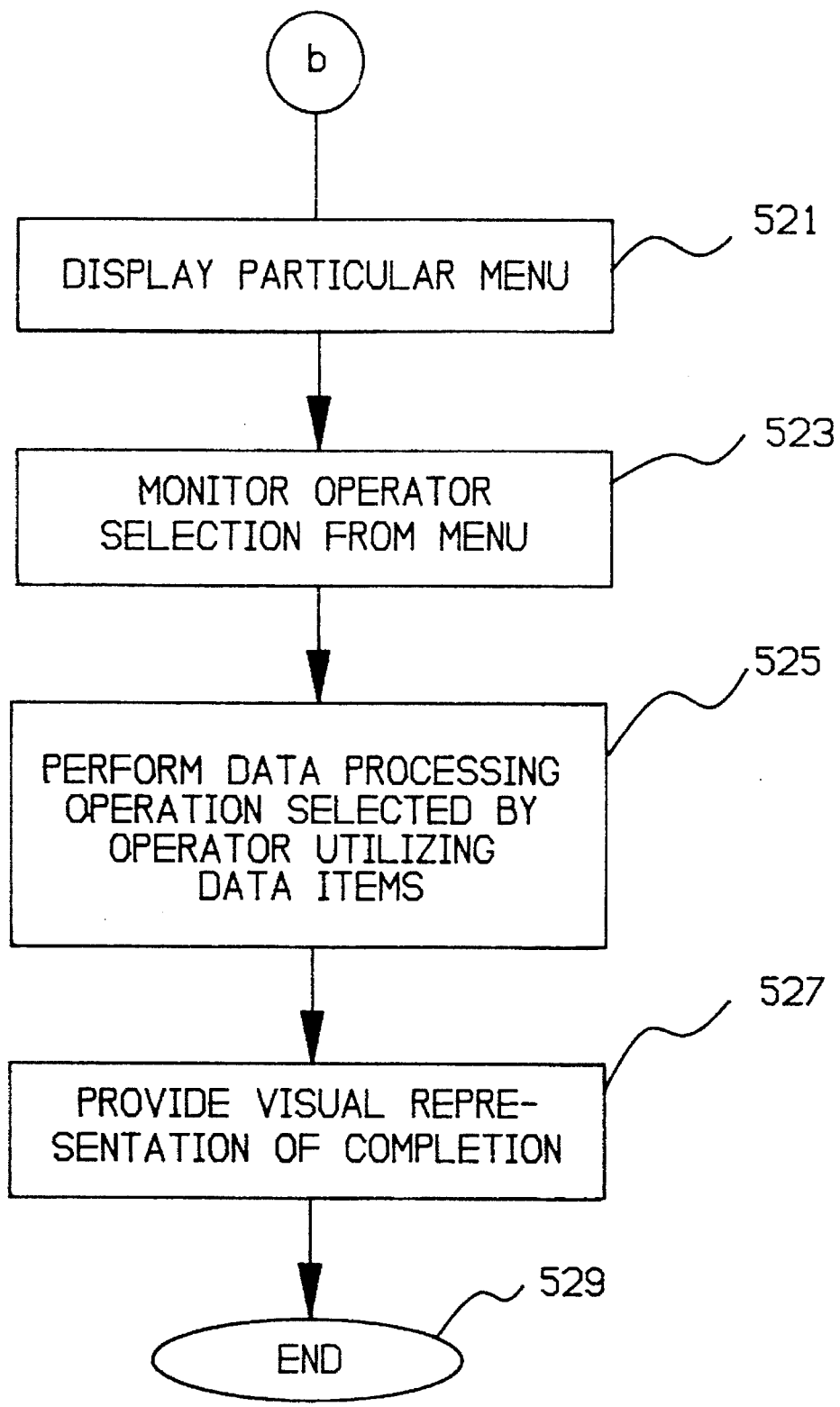

FIGS. 3, 4, and 5 will now be utilized to exemplify the operation of the preferred embodiment of the present invention. As is shown in FIG. 3, personal address book viewport 64 is open and active within display 30 of the data processing system. Cursor 32 may be utilized to initiate the integration association mode of operation by selecting integration button 40 in a point-and-click operation. In accordance with the present invention, integration button 40 is then highlighted or otherwise accentuated to identify to the operator that the integration association mode of operation has been initiated. Thereafter, the operator may utilize cursor 32 to navigate through personal address book viewport 64 and select one or more of the data items displayed therein in a point-and-click operation. The data processing system 10 records these selections for later use. The operator may select one or a very large number of the data items displayed in personal address book viewport 64. Then, cursor 32 may be utilized to select a particular one of icons 55. The selection of a particular one of icons 55 will not open that particular icon when the integration association mode of operation has been initiated.

In accordance with the present invention, cursor 32 can be utilized to navigate through personal address book viewport 64, after the integration association mode of operation is selected by performing a point-and-click operation with integration button 40. Cursor 32 can be utilized to select one or more of the data items from personal address book viewport 64 by performing a point-and-click operation with cursor 32 placed over the iconographic representation of the data item. In one particular embodiment of the present invention, the content of all the fields associated with any particular data item selected by the operator are recorded in memory in data processing system 10. Therefore, one or more of the address book entries may be selected through utilization of the graphical pointing device 20. After the operator has made all of his or her selections, cursor 32 may be placed over a particular one of the icons 55. For example, cursor 32 may be placed upon printer icon 60, and one or more of the mouse buttons depressed to select that icon for interaction with the data item selected from personal address book viewport 64. In accordance with the present invention, data processing system 10 includes a truth table recorded in memory which identifies the one or more possible actions between particular types of data and particular icons, such as printer icon 60. The truth table, for example, may indicate that only one operation is possible: that is, for example, printing the data items on the printer associated with printer icon 60.

Another example of the operation of the present invention is provided in FIG. 4. In this view, cursor 32 has been utilized to select one or more data items from personal address book viewport 64. Thereafter, the mail drawer icon 61 has been selected in a point-and-click operation utilizing cursor 32. Since the relationship between the data items in personal address book viewport 64 and the potential actions of mail drawer 61 is unclear, data processing system 10 automatically provides and displays pop-up menu 201 which displays a plurality of operator options specifically identifying the types of action allowed between the data item selected from the personal address book and the mail drawer associated with mail drawer icon 61. The pop-up menu 201 includes a plurality of menu items, such as "mail", "enclosure" and "close". The operator then utilizes cursor 32 to select one of these menu items. For example, by selecting the "mail" menu item, the operator ensures that the data item selected from personal address book window 64 are utilized as mailing addresses for particular documents defined before or after this particular operation.

Yet another example of the operation of the preferred embodiment of the present invention is depicted in FIG. 5. In this view, the graphical user interface of display screen 30 of data processing system 10 includes a plurality of software objects which are active and open. More specifically, in this view, personal address book viewport 64 is open and active in display 30, and shared address book viewport 94 is also open and active in the display 30. In FIG. 5, these software objects are shown in overlapping relation. Cursor 32 may be utilized to navigate through the data items presented in personal address book viewport 64, and one or more data items may be selected in a conventional point-and-click operation utilizing the graphical pointing device 20, and cursor 32.

Suppose that such data items have been selected, and further suppose that the operator has selected the shared address book as the software object with which an integration association operation is to be performed. Since there is no clear single contextual operation which can be performed with data items from the personal address book and the shared address book, pop-up menu 203 is provided and displayed in display 30 of data processing system 10. This particular pop-up menu 203 includes a plurality of menu items such as "add", "delete", "modify", "close", and "cancel". The operator may utilize cursor 32 to select a particular one of these menu items. For example, should the operator utilize cursor 32 to select the "add" menu item in a conventional point-and-click operation, the data items previously selected from personal address book viewport 64 are automatically added to the shared address book which is displayed in shared address book viewport 94. If, alternatively, should the operator select the "delete" menu item, the particular data items in shared address book which correspond to those data items selected from personal address book viewport 64 would be eligible for modification, and further menu screens would be provided to allow such modification. In this manner, one or more cascading pop-up menus may be provided to facilitate the operations which are possible in the integrated association mode of operation. The more ambiguous the relationship between the data items selected and the iconographic representation of either a software object or data processing implemented operation, the more menus required, and associated menu items, in order to guide the operator through a decision making process to allow an accurate determination of what particular operation is being invoked.

FIGS. 6A–6D provide a high-level flowchart representation of the broad concepts which underlie the present invention. The process starts at software block 501, and continues at software block 503, wherein a source software object is open in the graphical user interface of display 30 of data processing system 10. The present invention requires that one object be open in the display in a manner which exposes a plurality of data items for selection by the operator. Next, in accordance with software block 205, data processing system 10 determines whether the operator has selected the integration association mode of operation by engaging in a point-and-click operation with integration button 40. If the operator has not made such a selection, the process continues polling for operator selection; however, if the operator has made such a selection, the process continues at software block 507, wherein a visual acknowledgement of such selection is provided. The operator may be advised (that is, reminded) of his or her selection by altering the display of either integration button 40, cursor 32, or the software object which includes the plurality of data items from which a selection is to be made.

In accordance with software block 509, data processing system 10 then continuously monitors and records the operator's selection of the data items from the source software object. Next, in accordance with software block 511, data processing system 10 determines whether the operator has selected an icon which is representative of either (1) a particular software object with which interaction is sought, or (2) a particular data processing implemented operation which is to be performed and which involves the previously selected data items. Once the data processing system 10 has determined that the operator has defined the software object or data processing operation, the process continues in accordance with software block 513, wherein data processing system 10 provides a visual acknowledgement in the graphical user interface of display 30 to inform the operator of his or her selection. This can be accomplished by bolding, flashing, or otherwise accentuating the selected icon.

Data processing system 10 must then determine whether a single predetermined contextual relationship exists between the data item selected by the operator and the icon (which is representative of either (1) a software object, or (2) a data processing implemented operation). If a single contextual relationship exists, the process continues at software block 517; however, if no single contextual relationship exists, the process continues at software block 521. If a single contextual relationship exists, in accordance with software block 517, data processing system 10 performs the particular data processing operation which is identified with the contextual relationship, and utilizes the data items selected by the operator in performing this particular data processing operation. Then, in accordance with software block 519, data processing system 10 provides a visual representation to the operator of completion of the data processing operation. Typically, this may be provided by a return of the graphical user interface to a normal condition. More specifically, the completion of the task can be communicated to the operator by removing the emphasis which has been supplied to cursor 32, the open and active software object, the data item selected by the operator from the open and active software object, or the iconographic representation of the data processing operation or software object which has been selected by the operator. In other words, completion of the task can be identified by a removal of all indications of the integrated association mode of operation.

If it is determined in software block 515 that no single contextual relationship exists, in accordance with software block 521, data processing system 10 displays a particular predefined menu, preferably which is generated as a result of examination by data processing system 10 of a truth table for the various possible relationships which may exist between the data items selected by the operator and the icon selected by the operator. Then, in accordance with software block 523, data processing system 10 continuously monitors for operator selection of an item from the provided menu. Next, in accordance with software block 525, data processing system 10 performs the data processing operations which have been selected by the operator utilizing the data items which have been selected by the operator from the open and active software object. Finally, the data processing system 10 provides a visual representation of completion of this particular task, as discussed above, by returning the graphical user interface to its normal condition by removing all emphasis in the graphical user interface which indicates to the operator that the integrated association mode of operation is empowered.

Figure 7:
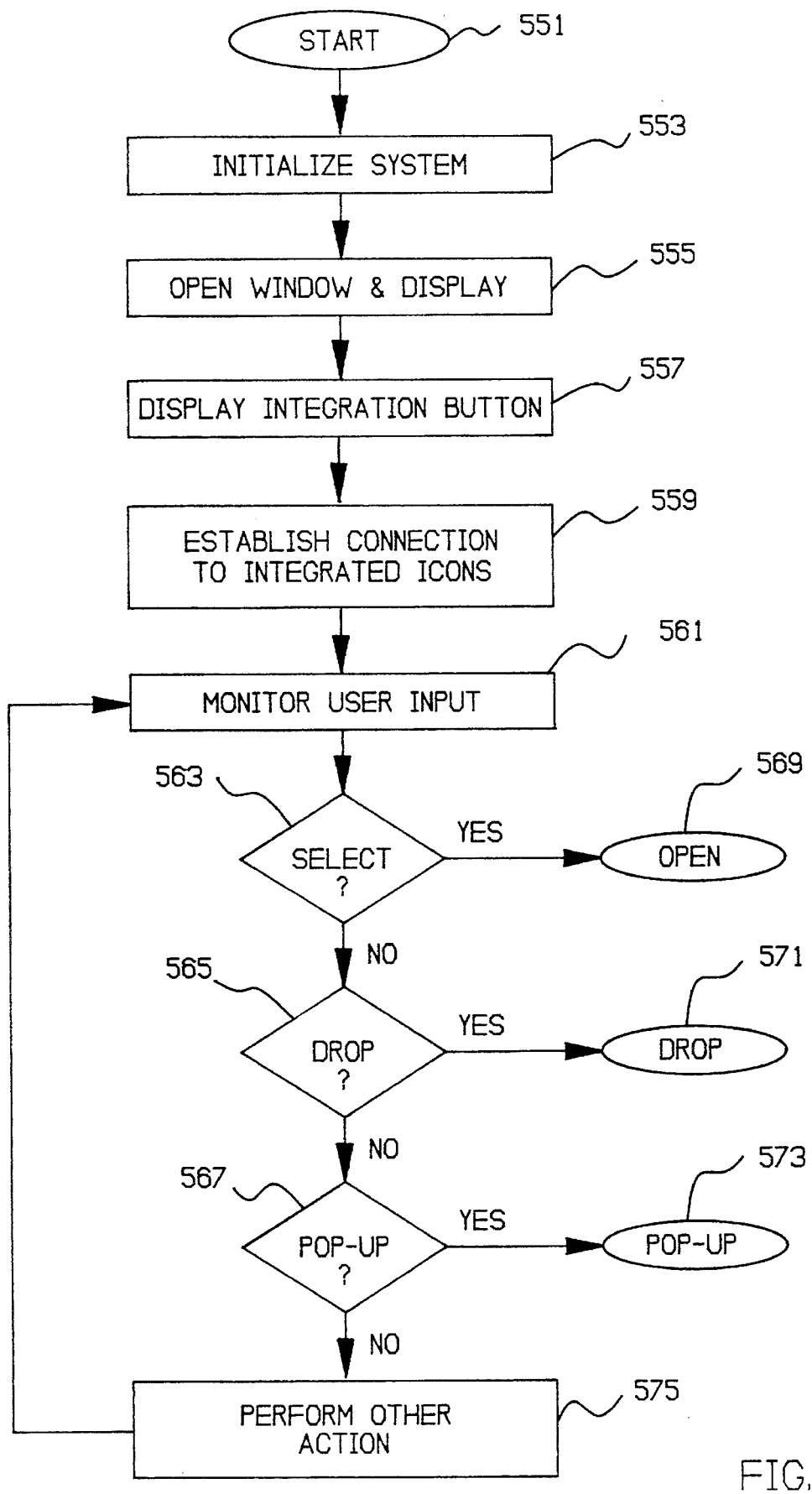
FIG. 7 is a more detailed flowchart representation of the integrated association mode of operation of the present invention.

FIG. 7 is a more detailed flowchart representation of one program which implements the objective of the present invention. In software block 551, the routine starts. Next, in accordance with software block 553, data processing system 10 is initialized. Next, in accordance with software block 555, data processing system 10 opens the graphical user interface, the particular viewports within the graphical user interface, and all associated displays. In accordance with software block 557, data processing system 10 then displays the integration button 40.

Next, in accordance with software block 559, data processing system 10 establishes a connection between particular icons which are eligible for access to the integrated association mode of operation, and the function of the integrated association mode of operation which is represented by integration button 40. Then, in accordance with software block 561, data processing system 10 monitors for user input, including: operator selection of the integrated association mode of operation as determined by selection of integration button 40, the operator's identification of particular data items in an open and active software object, and the operator selection of an icon which is representative of either a software object or data processing implemented operation. Three particular subroutines are identified in software blocks 563, 565, 567 of FIG. 7. In the routine represented by software block 563, data processing system 10 identifies the operator selection of the integration button 40, which causes the integrated association mode of operation program to open, as is depicted in software block 569.

Figure 8:
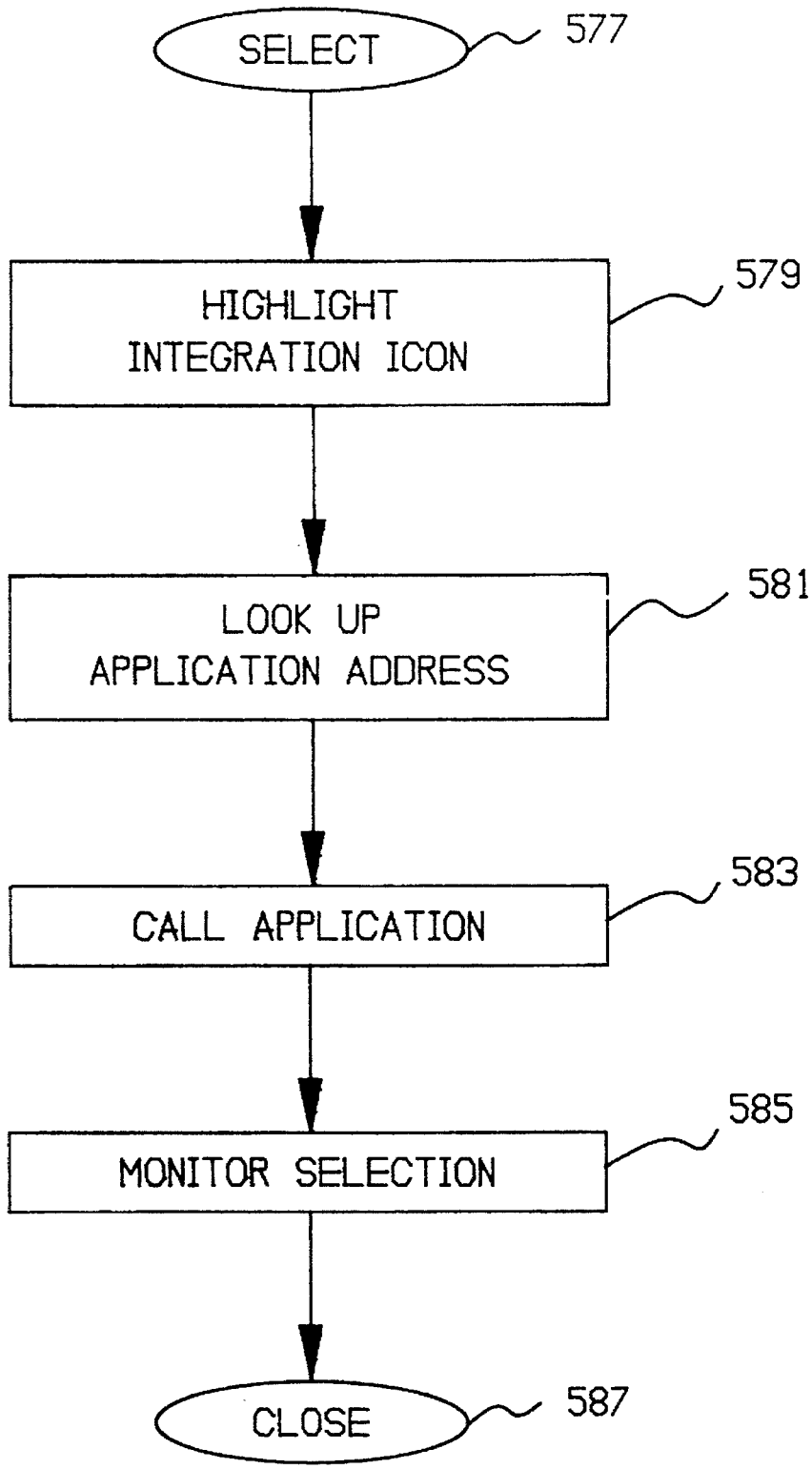
FIGS. 8, 9, and 10 are flowchart representations of operational subroutines of the flowchart of FIG. 7.

FIG. 8 represents in flowchart form the data processing implemented steps of opening the integrated association mode of operation. In accordance with software block 577, data processing system 10 identifies that the integrated association mode of operation has been selected. Next, in accordance with software block 579, data processing system 10 highlights the integration button 40. Next, in accordance with software block 581, data processing system 10 looks up the application address for the routine associated with the integrated association mode of operation. Then, in accordance with software block 583, data processing system 10 calls the application. Next, in accordance with software block 585, data processing system 10 monitors for operator selection of data items from a particular open and active software object. When the integrated association mode of operation is terminated, the program will close in accordance with software block 587.

Figure 9:
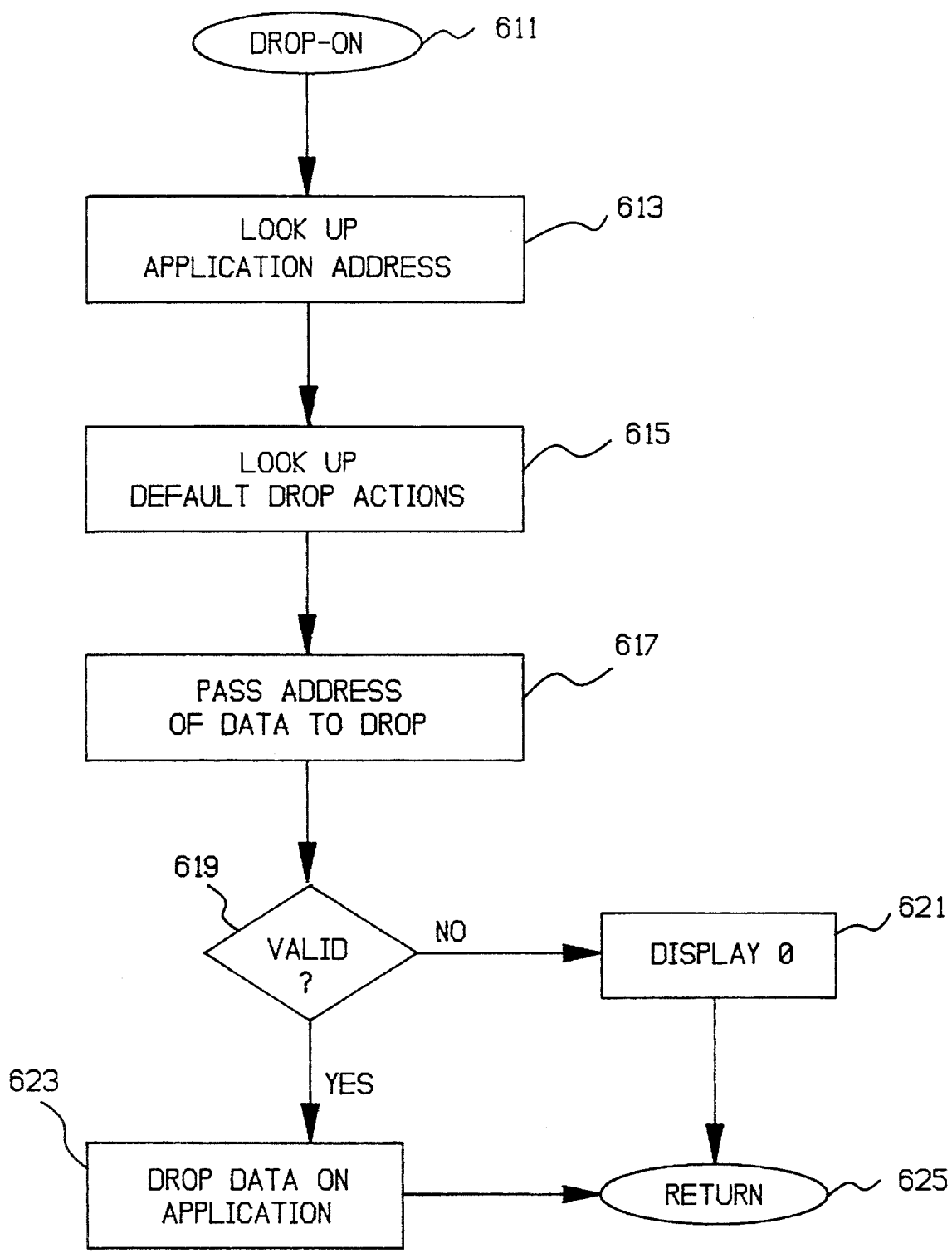

Software block 565 is representative of the routine which corresponds to the "dropping" of the selected data items to an icon which is representative of either a software object or a data processing implemented operation. Data processing system 10 monitors operator activity to determine that the operator has ceased selecting data items from the open and active software object in the graphical user interface, and selected a particular icon which is representative of the software object or data processing implemented operation. This operator "decision" is determined by identifying the location of cursor 32 over one of the icons in the graphical user interface which are permitted to interact with data items in the integrated association mode of operation. Furthermore, data processing system 10 monitors for operator actuation of one or more buttons on the graphical pointing device 20 (that is, the mouse). If these conditions are detected, the process continues in accordance with software block 571 by going to the "drop-on" routine which is depicted in FIG. 9. The routine begins at software block 611, and continues at software block 613, wherein the application address is looked-up by the data processing system 10. Next, in accordance with software block 615, data processing system 10 examines a truth table in memory to determine if a single contextual relationship exists between the data items which have been selected and the particular icon which has been selected. This can be referred to as a "default drop action".

Next, in accordance with software block 617, data processing system 10 passes the address of the data selected from the open and active software object to the software object or data processing implemented action represented by the icon. In accordance with software block 619, data processing system 10 determines whether such an action is valid; if it is not valid, the data processing system prompts the user in a display in accordance with software block 621; however, if the dropping action is valid, the selected data items from the open and active software object are dropped onto the application which is represented by the selected icon. In either event, the routine returns to the main program in accordance with software block 625.

Figure 10:
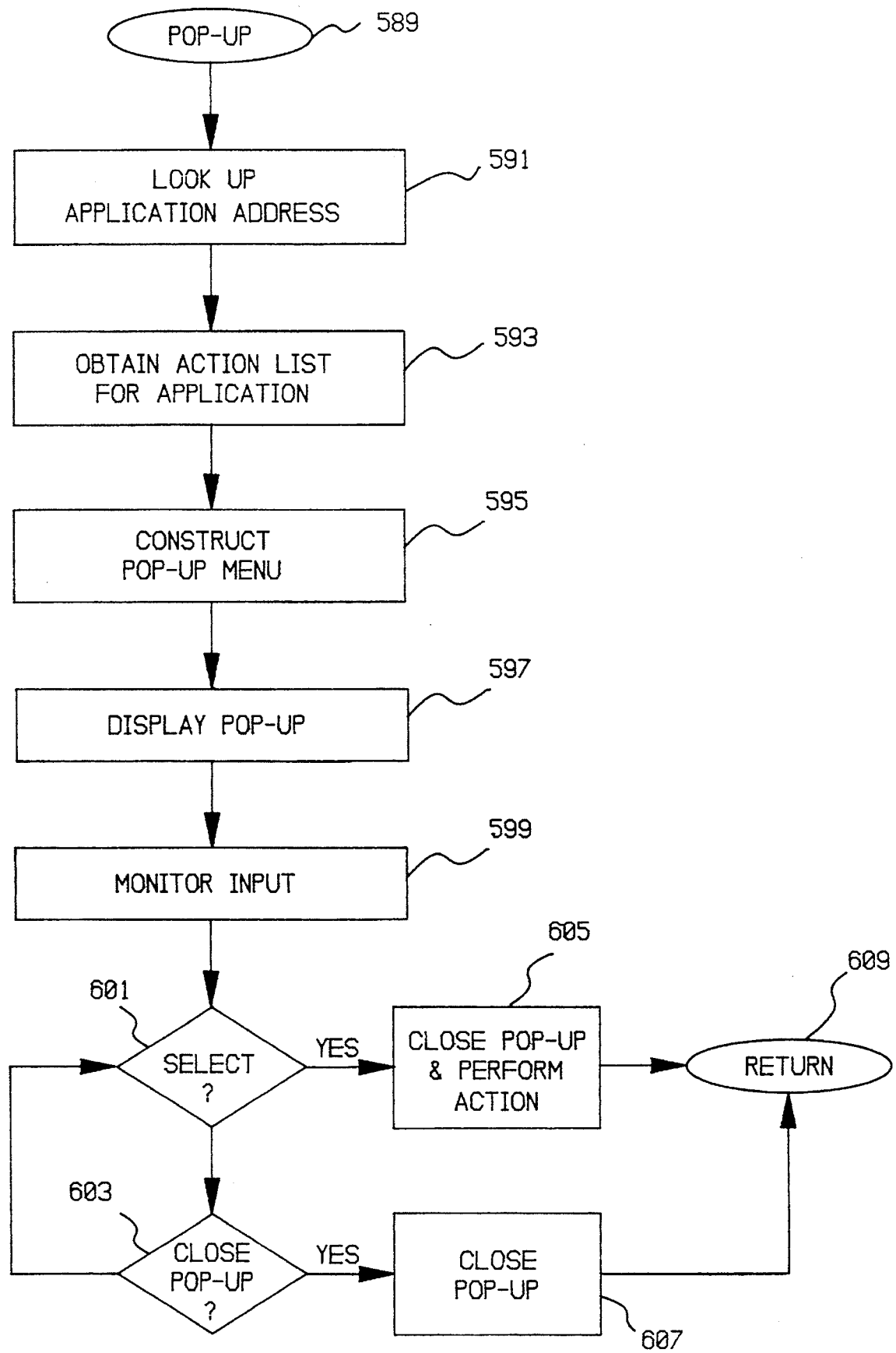

In FIG. 7, software block 567 is representative of a pop-up routine which is called when it is determined that no single contextual relationship exists between the data item selected by the operator and the software object or data processing implemented operation represented by the icon which has also been selected by the operator. Preferably, this routine is called if it is determined during the drop-on routine that no single contextual relationship exists. In accordance with software block 573 of FIG. 7, the pop-up routine is called in those circumstances. The pop-up routine is depicted in flowchart form in FIG. 10. The routine begins at software block 589, and continues at software block 591, wherein data processing system 10 looks up the application address. Next, in accordance with software block 593, data processing system 10 obtains an action list for the particular application, which includes all the possible operator selections. Then, in accordance with software block 595, data processing system 10 constructs a pop-up menu which is displayed to the operator in accordance with software block 597. Data processing system 10 then monitors for operator input, in accordance with software block 599 to determine the operator's selection in accordance with software block 601. Once a selection has been made, the pop-up menu is closed, and the data processing system 10 performs a particular operation selected by the operator, in accordance with software block 605, and the process returns to normal operation in accordance with software block 609. The operator may choose to close the pop-up menu, as is depicted at software block 603; if so, the process continues at software block 607 by closing the pop-up menu.

While the invention has been particularly shown and described with reference to a preferred embodiment, it will be understood by those skilled in the art that various changes in form and detail may be made therein without departing from the spirit and scope of the invention.

We claim:

1. A method of facilitating icon-based operations in a data processing system graphical user interface having a plurality of icons representative of either software objects or data-processing-implemented operations, comprising the data processing implemented steps of:
   (a) allowing at least one software object to remain open and active in a visual display of said data processing system, said software object displaying a plurality of data items;
   (b) providing, in said graphical user interface, a operator-selectable visual representation of an integrated operation association between (1) said at least one software object which is open and active in said visual display of said data processing system and (2) at least one of said plurality of icons;
   (c) monitoring for (1) operator selection of said visual representation of an integrated operation association, and (2) operator utilization of a graphical pointing device to select at least one of said plurality of data items;
   (d) recording operator selection of said at least one of said plurality of data items; thereafter
   (e) monitoring for operator utilization of said graphical pointing device to select at least one of said plurality of icons;
   (f) performing a particular data-processing-implemented operation involving (1) recorded operator selection of said at least one of said plurality of data items, and (2) said software object or data-processing-implemented operation represented by the selected ones of said plurality of icons.

2. A method of facilitating icon-based operations according to claim 1, wherein, during said step of performing said particular data-processing-implemented operation, software objects represented by said at least one of said plurality of icons which are selected are maintained in a closed but active condition.

3. A method of facilitating icon-based operations according to claim 2, wherein said particular data-processing-implemented operation is determined by one of:
   (a) a predetermined contextual relationship between said at least one software object which is open and active in said visual display and said at least one of said plurality of icons which is selected by said operator; and
   (b) operator selection of a menu item from a menu associated with said operator-selectable visual representation of an integrated operation association.

4. A method of facilitating icon-based operations according to claim 1, further comprising:
   (g) optionally displaying a menu responsive to operator selection of said operator-selectable visual representation of an integrated operation association.

5. A method of facilitating icon-based operations according to claim 4, wherein said menu displays operator-selectable operation options which define said particular data-processing-implemented operation.

6. A method of facilitating icon-based operations in a data processing system graphical user interface having a plurality of icons representative of either software objects or data-processing-implemented operations, comprising the data processing implemented steps of:
   (a) maintaining at least one software object in an open and active condition in a visual display of said data processing system, said software object displaying a plurality of data items;
   (b) providing, in said graphical user interface, a operator-selectable visual representation of an integrated operation association between (1) said at least one software object which is open and active in said visual display of said data processing and (2) at least one of said plurality of icons;
   (c) monitoring for (1) operator selection of said visual representation of an integrated operation association, and (2) operator utilization of a graphical pointing device to select at least one of said plurality of data items;
   (d) recording operator selection of said at least one of said plurality of data items; thereafter
   (e) monitoring for operator utilization of said graphical pointing device to select at least one of said plurality of icons;
   (f) automatically determining whether or not a single predetermined contextual relationship exists between said at least one of said plurality of data items and said at least one of said plurality of icons;
   (g) if a single predetermined contextual relationship exists, performing a particular data-processing-implemented operation involving (1) recorded operator selection of said at least one of said plurality of data items, and (2) said software object or data-processing-implemented operation represented by the selected ones of said plurality of icons;
   (h) if no single predetermined contextual relationship exists:
      (1) automatically displaying a menu associated with said operator-selectable visual representation of an integration operation association, with a plurality of operator-selectable menu items;

(2) monitoring for operator selection of a particular one of said plurality of operator-selectable menu items; and (3) performing a particular data-processing implemented operation identified with said particular one of said plurality of operator-selectable menu items involving (a) recorded operator selection of said at least one of said plurality of data items, and (b) said software object or data-processing-implemented operation represented by the selected ones of said plurality of icons.

7. A method of facilitating icon-based operations according to claim 6, wherein, during said step of performing said particular data-processing-implemented operation, any operator-selected software objects represented by said at least one of said plurality of icons are maintained in a closed but active condition.

8. A method of facilitating icon-based operations according to claim 6, wherein said menu displays operator-selectable operation options which define particular data-processing-implemented operations.

9. A method of facilitating icon-based operations in a data processing system graphical user interface having a plurality of icons representative of either software objects or data-processing-implemented operations, comprising the data processing implemented steps of:

(a) allowing at least one software object to remain open and active in a visual display of said data processing system, said software object displaying a plurality of data items;

(b) providing, in said graphical user interface, a operator-selectable visual representation of an integrated operation association between (1) said at least one software object which is open and active in said visual display of said data processing and (2) at least one of said plurality of icons;

(c) monitoring for operator selection of said visual representation of an integrated operation association;

(d) producing a visual indication of initiation of an integrated operation association mode of operation;

(e) monitoring for operator utilization of a graphical pointing device to select at least one of said plurality of data items;

(f) recording operator selection of said at least one of said plurality of data items; thereafter (g) monitoring for operator utilization of said graphical pointing device to select at least one of said plurality of icons;

(h) performing a particular data-processing-implemented operation involving (1) recorded operator selection of said at least one of said plurality of data items, and (2) said software object or data-processing-implemented operation represented by the selected ones of said plurality of icons.

10. A method of facilitating icon-based operations according to claim 9, wherein, during said step of performing said particular data-processing-implemented operation, any operator-selected software objects represented by said at least one of said plurality of icons are maintained in a closed but active condition.

11. A method of facilitating icon-based operations according to claim 10, wherein said particular data-processing-implemented operation is determined by one of:

(a) a predetermined contextual relationship between said at least one software object which is open and active in said visual display and said at least one of said plurality of icons which is selected by said operator; and (b) operator selection of a menu item for a menu associated with said operator-selectable visual representation of an integrated operation association.

12. A method of facilitating icon-based operations according to claim 9, further comprising:

(i) optionally displaying a menu responsive to operator selection of said operator-selectable visual representation of an integrated operation association.

13. A method of facilitating icon-based operations according to claim 12, wherein said menu displays operator-selectable operation options which define said particular data-processing-implemented operation.

14. A method of facilitating icon-based operations according to claim 9, further comprising:

(i) terminating said visual indication of initiation of said integrated operation association mode of operation.

15. In a data processing system graphical user interface which simultaneously displays a plurality of software objects, a method of facilitating operator integration of items between software objects, comprising the data processing implemented method steps of:

(a) allowing operator selection of a source software object within said data processing system;

(b) recording said operator selection; thereafter (c) monitoring operator input from a graphical pointing device for selection of items present in said source software object; and (d) monitoring operator input for selection of a toolbar item in said graphical user interface with said graphical pointing device;

(e) automatically initiating a data-processing implemented operation involving (1) said items selected, and (2) said toolbar item, without opening a software object represented by said toolbar item.

16. A method of facilitating operator integration of items between software objects, according to claim 15, wherein said data-processing-implemented operation comprises one of:

(a) copying said items to a software object represented by said toolbar item;

(b) transferring said items to a software object represented by said toolbar item;

(c) modifying items present in a software object represented by said toolbar items in accordance with items selected from said source software object;

(d) deleting selected items from said source software object;

(e) printing selected items from said source software object.

17. A method in a graphical user interface of a data processing system of facilitating operator initiated integration of items between software objects, comprising the data-processing-implemented method steps of:

(a) providing a visual representation in said graphical user interface of an integrated operation association mode of operation;

(b) monitoring operator input for selection of said visual representation in said graphical user interface of an integrated operation association mode of operation and enabling said integrated operation association mode of operation in response to said operator input;

(c) during said integrated operation association mode of operation, monitoring operator input for selection of at least one source object;

(d) during said integrated operation association mode of operation, monitoring operator input from a graphical pointing device for selection of items present in said source object;

(e) monitoring operator input for selection of a toolbar item;

(f) automatically initiating a data-processor-implemented operation involving (1) said items from said source software object, and (2) a software object or operation represented by said toolbar item, while maintaining any software object represented by said toolbar item in a closed but active condition.

18. A data processing system which simultaneously displays a plurality of software objects and facilitates operator integration of items between software objects, comprising:

(a) means for allowing operator selection of a source software object;

(b) means for recording said operator selection;

(c) means for monitoring operator input from a graphical pointing device for selection of items present in said source software object;

(d) means for monitoring operator input from a graphical pointing device for selection of a toolbar item;

(e) means for initiating a data-processing-implemented operation involving (1) said source software object, and (2) a software object or data processing operation represented by said toolbar item.

\* \* \* \* \*